Reissue.
[97.] J. S. Alter. Gauging & Plaiting Attachment.
No. 4,556. Reissued Sep. 19, 1871.
Fig. 4.
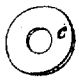
Fig. 6.
Fig. 5.
Fig. 1.
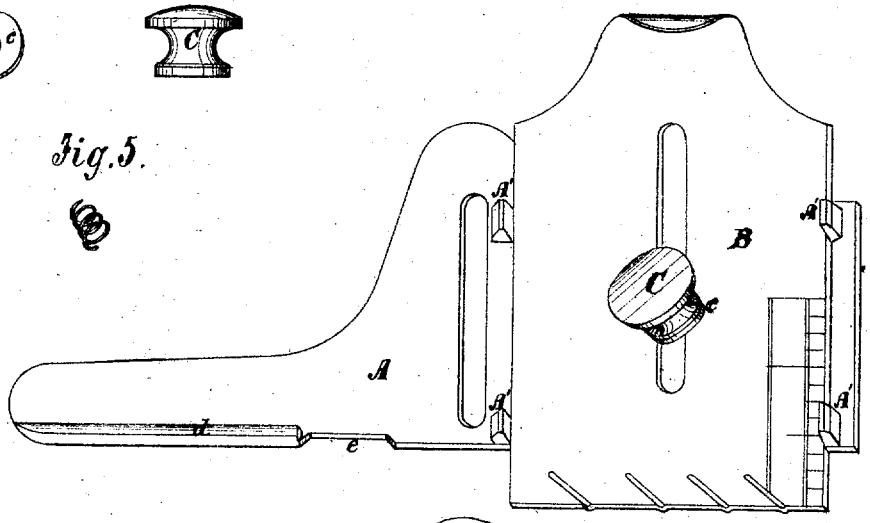
Fig. 2.
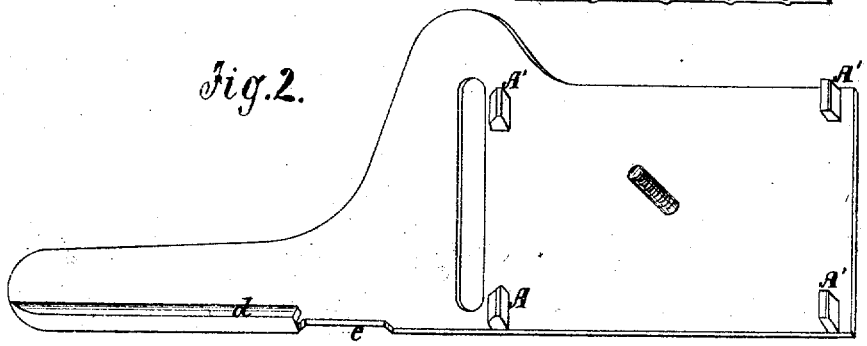
Fig. 3.
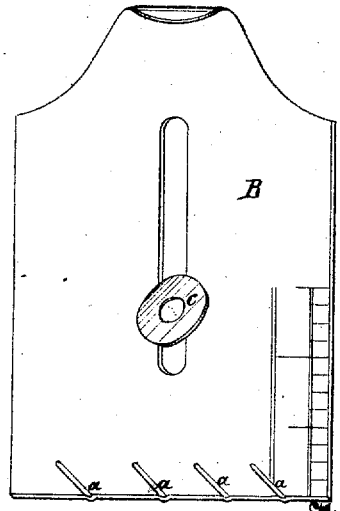
Witnesses:
Wm. H. C. Smith.
Alex J. Roberts.
Inventor:
J. S. Alter.
PER Wm. H. C.
Attorneys.
AM. PHOTO-LITHOGRAPHIC CO. N.Y. (OSBORNE'S PROCESS.)

UNITED STATES PATENT OFFICE.

JACOB S. ALTER, OF LEAVENWORTH, KANSAS.

IMPROVEMENT IN GUIDES FOR SEWING-MACHINES.

Specification forming part of Letters Patent No. 102,469, dated May 3, 1870; reissue No. 4,556, dated September 19, 1871.

*To all whom it may concern:*

Be it known that I, JACOB S. ALTER, of Leavenworth, in the county of Leavenworth and State of Kansas, have invented a new and Improved Gauging and Plaiting Attachment; and I do hereby declare that the following is a full, clear, and exact description thereof, which will enable others skilled in the art to make and use the same, reference being had to the accompanying drawing forming part of this specification, in which—

Figure 1 is a perspective view of the combined arrangement of gauge and plaiter as fixed for attachment and operation. Fig. 2 represents the bottom plate or gauge. Fig. 3 is a view of the adjustable sliding plate or cloth-holder. Fig. 4 represents the washer detached. Fig. 5 is a perspective view of the coiled steel spring, and Fig. 6 a horizontal view of female screw, which, encircling said coiled spring and being screwed down, firmly grasps and holds all together during the operation of sewing.

Similar letters of reference indicate corresponding parts.

My invention consists in the construction, as hereinafter described, of an adjustable gauge-plate with a cloth-holder so as to form a valuable attachment for sewing-machines, particularly in making shirt-bosoms or similar work. It is capable of attachment to any of the standard sewing-machines, and in operation will be found to greatly facilitate the labor of plaiting or folding any desired width of plait.

Fig. 1 of the drawing shows my improvement as arranged for attachment and operation on a sewing-machine having the front movement, the upper plate being adjustable so as to regulate the size of plait, and by the controlling office of the ribs on its under side the cloth or other material being sewed is drawn, kept, or held in its place.

In said Fig. 1, A is the bottom or gauge, and B is the sliding plate or cloth-holder. *a* represents depressions or grooves pressed or stamped into the upper surface of the end of this plate, which projects over the cloth, forming ribs or projecting parts, which, being inclined from the line in which the cloth moves toward the guide A, serve to draw the cloth toward said guide and keep the edge always against it. These ribs, being placed on the under side of the upper plate, are much more serviceable in guiding the cloth than when placed on the upper side of a plate below the cloth. Fig. 3 represents the sliding plate B detached, showing the plaiting-scale and depressions *a a a a* and the washer *c*, and ready to be placed in position across the bottom plate A, after which the coiled spring is put on the screw over washer *c* and the pressure regulated by means of the nut C and screw *b*. Fig. 4 is a detached front view of washer *c*. Fig. 5 is a side view in perspective of the coiled spring; and Fig. 6 represents a side view of the nut C for regulating the adjustment of the gauge or pressure upon the material being sewed. The plate B is adjusted to project as far beyond the plate A as the predetermined width of the plait is to be, the amount of such projection being readily determined by the scale on it. By my combined arrangement herein described the pressure upon the material can be regulated by the nut C, which fits a screw, *b*, permanently fixed in the bottom plate and encircled by a coiled steel spring, Fig. 5, which rests upon a washer, *c*, the whole forming a much-needed improvement in the adjuncts of machinery for the speedy manufacture of shirt-bosoms, tucks, and work of that class. Fig. 2 represents the bottom plate A with shoulders for holding the sliding plate or cloth-holder B and the screw *b*, around which the coiled spring, Fig. 5, and washer *c* are to be affixed, as in Fig. 1, and covered by the nut C. *d* is the guiding-flange, and *e* the notch for the presser-foot.

The peculiarity and advantage of my improvement consist, further, in its adaptability, as herein shown, to any of the sewing-machines having the side movement, while the gauge and plaiter need only be made in reverse form from that shown in the drawing to be at once affixed to any sewing-machine not having the side movement—all the parts being admirably suited to the purpose, and by their conjoint operation effecting a very great saving of time in manufacturing shirt-bosoms, plaits, and tucks.

My improved attachment may be made of brass, steel, or any of the hard metals known to the trade, or any other suitable material; and when adjusted is held in place or fastened by the usual gauge-screw, accompanying all sewing-machines, through the slot made in the bottom plate A, and is thus capable of being moved and fastened either way to accommodate the desired width of fold or plait, and govern the grasp of the cloth-holder and guide the material being sewed.

By the action of the coiled spring, Fig. 5, and nut C the pressure is regulated on the material being sewed, the width of the plait being regulated by the sliding plate B.

Having thus described my invention, I claim as new and desire to secure by Letters Patent—

1. The combination of coiled spring, with nut C, fixed screw *b*, and washer *c* with the plate B, as described, to regulate the pressure on the material, as set forth.

2. The adjustable gauge-plate A, having notch and guiding-flange, for the presser-foot and guide-shoulders for the cloth-holder, arranged with a rigid slotted ribbed plate B, held by spring-pressure, so that it can adapt itself to the thickness of cloth, and also slide out and in, a fixed pin rising from the adjustable gauge-plate, as and for the purpose specified.

The above specification of my invention signed by me this 30th day of May, 1871.

JACOB S. ALTER.

Witnesses:

GEO. W. MABEE,

T. B. MOSHER.

(97.)